(12) United States Patent
Mazzaro et al.

(10) Patent No.: US 11,647,887 B2
(45) Date of Patent: May 16, 2023

(54) GASKET FOR DISHWASHER, DISHWASHER INCLUDING SUCH GASKET AND ASSOCIATED ASSEMBLY METHOD

(71) Applicant: INDUSTRIE ILPEA S.P.A., Malgesso (IT)

(72) Inventors: Sandro Mazzaro, San Vito al Tagliamento (IT); Paolo Cittadini, Luvinate (IT)

(73) Assignee: INDUSTRIE ILPEA S.P.A., Malgesso (IT)

( * ) Notice: Subject to any disclaimer, the term of this patent is extended or adjusted under 35 U.S.C. 154(b) by 32 days.

(21) Appl. No.: 16/787,164

(22) Filed: Feb. 11, 2020

(65) Prior Publication Data
US 2020/0260931 A1    Aug. 20, 2020

(30) Foreign Application Priority Data
Feb. 15, 2019    (IT) .................. 102019000002209

(51) Int. Cl.
*A47L 15/42*    (2006.01)

(52) U.S. Cl.
CPC .............................. *A47L 15/4263* (2013.01)

(58) Field of Classification Search
CPC ...................... A47L 15/4263; D06F 37/266
See application file for complete search history.

(56) References Cited

U.S. PATENT DOCUMENTS

| 2011/0031855 A1* | 2/2011 | Karakaya ............... A01N 25/34 |
| | | 312/228 |
| 2011/0031856 A1* | 2/2011 | Haltmayer .......... A47L 15/4263 |
| | | 312/228 |
| 2012/0098393 A1* | 4/2012 | Fischer ............... A47L 15/4263 |
| | | 312/228 |
| 2015/0123524 A1* | 5/2015 | Ser ...................... A47L 15/4263 |
| | | 49/506 |
| 2016/0153698 A1* | 6/2016 | Gu ........................ F25D 23/028 |
| | | 312/405 |
| 2020/0217217 A1* | 7/2020 | Girard .................. F04D 29/322 |

FOREIGN PATENT DOCUMENTS

| CN | 107049197 A | * | 8/2017 | ......... A47L 15/4251 |
| DE | 102017203978 A1 | * | 9/2018 | ............. A47L 15/42 |
| DE | 102017203978 B4 | * | 5/2019 | ......... A47L 15/4263 |
| EP | 2422680 A2 | * | 2/2012 | ......... A47L 15/4263 |
| KR | 20070078130 A | * | 7/2007 | |
| WO | WO-2018227826 A1 | * | 12/2018 | |

* cited by examiner

*Primary Examiner* — Spencer E. Bell
*Assistant Examiner* — Omair Chaudhri
(74) *Attorney, Agent, or Firm* — Amster, Rothstein & Ebenstein LLP

(57) ABSTRACT

The invention relates to a seal for a dishwasher adapted to be interposed between a peripheral edge of an opening of a tub for cookware and a door for closing said opening. The seal comprises a metal part adapted to be connected to the peripheral edge of the opening, a first part, made of polymeric material, integrally connected to the metal part and a second part, made of polymeric material, associated with the first part and adapted to be contacted by the door when the door is arranged in a position for closing the opening.

15 Claims, 11 Drawing Sheets

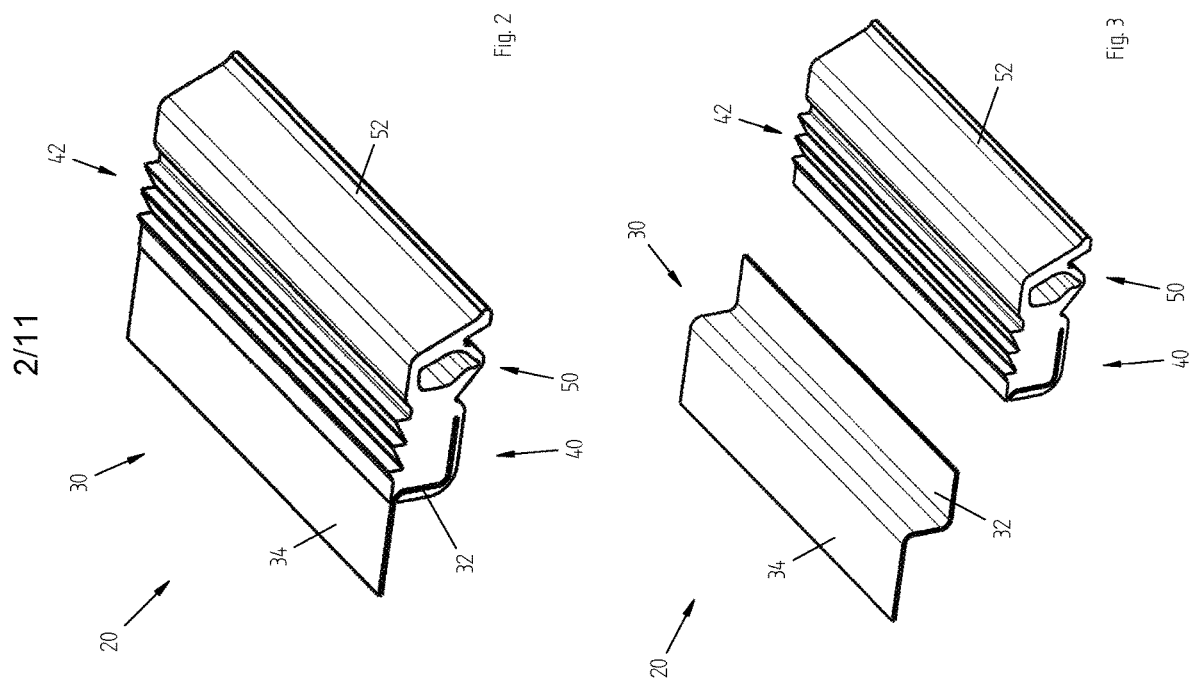

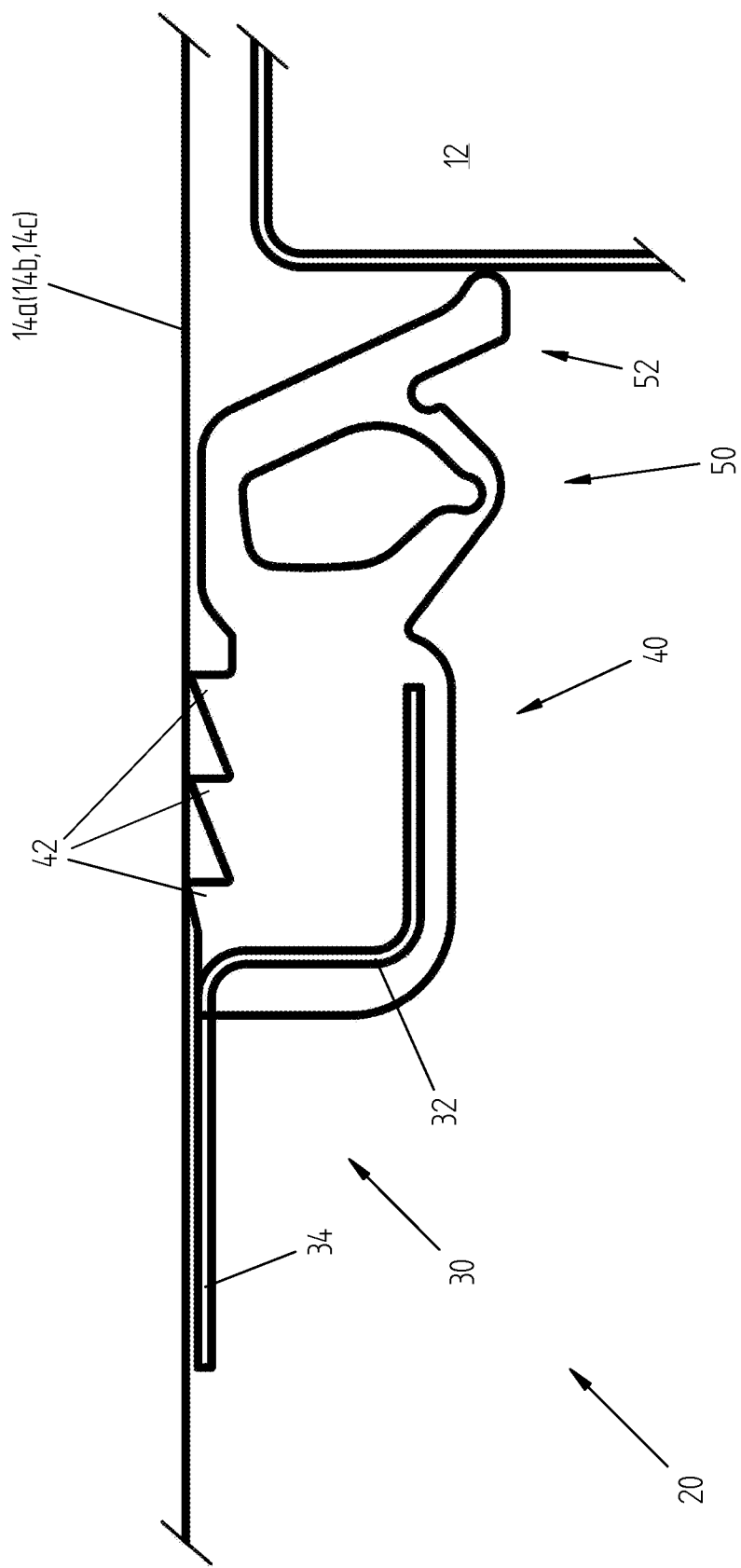

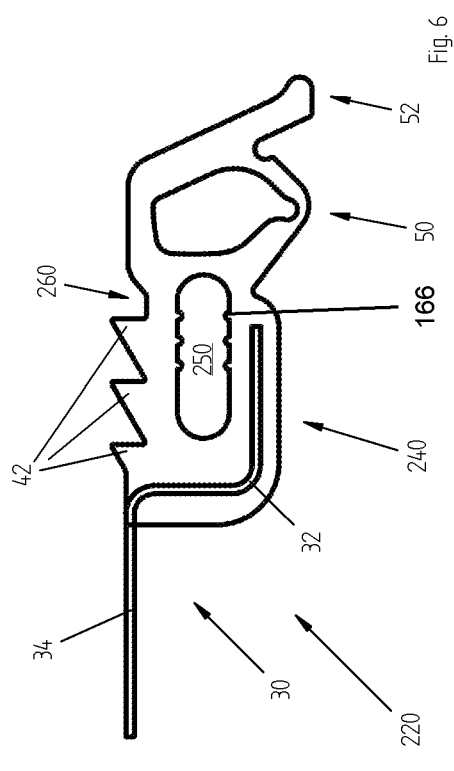
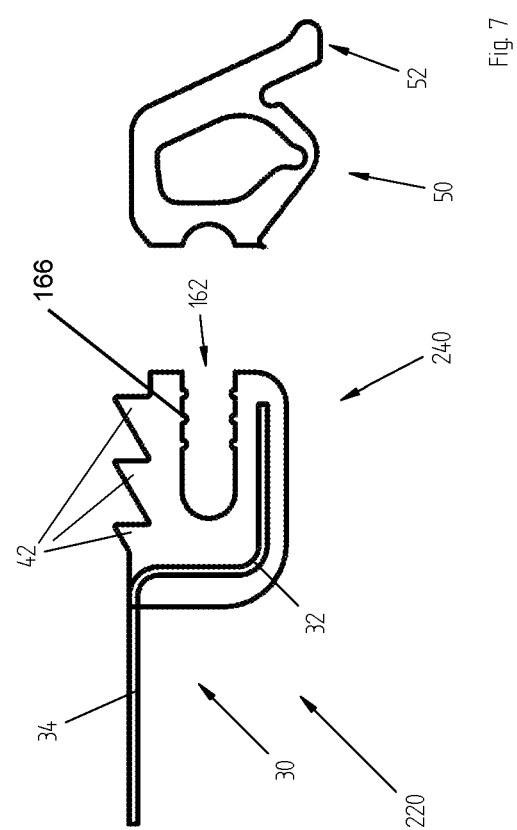

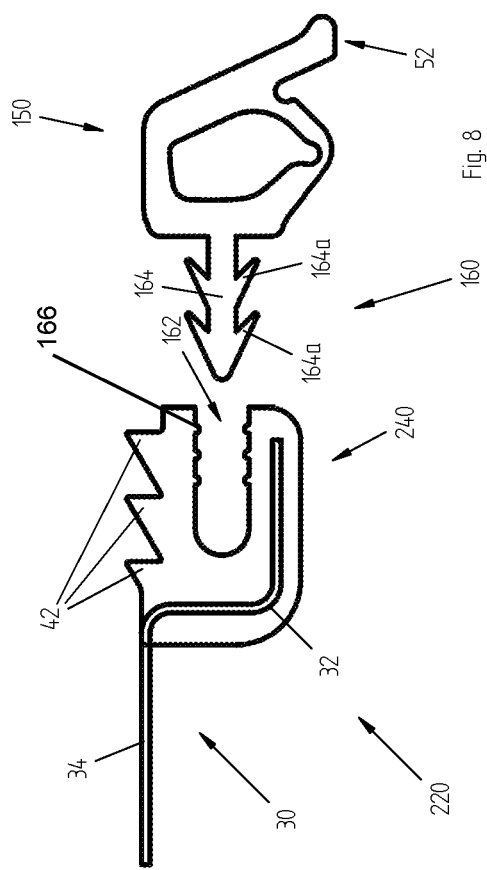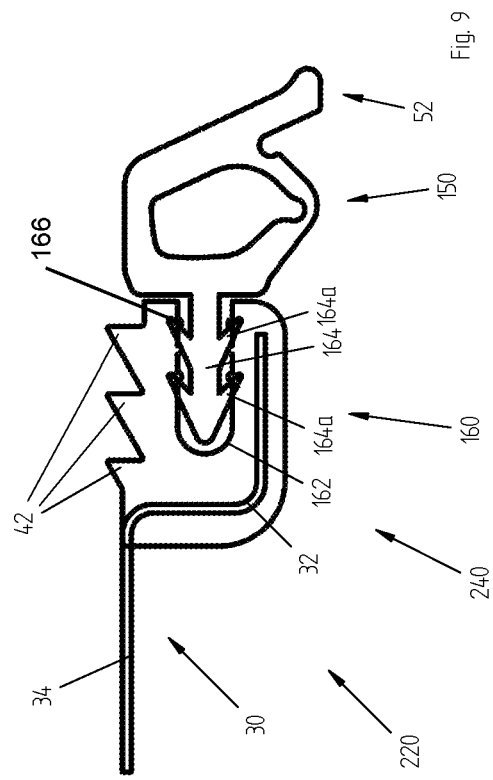

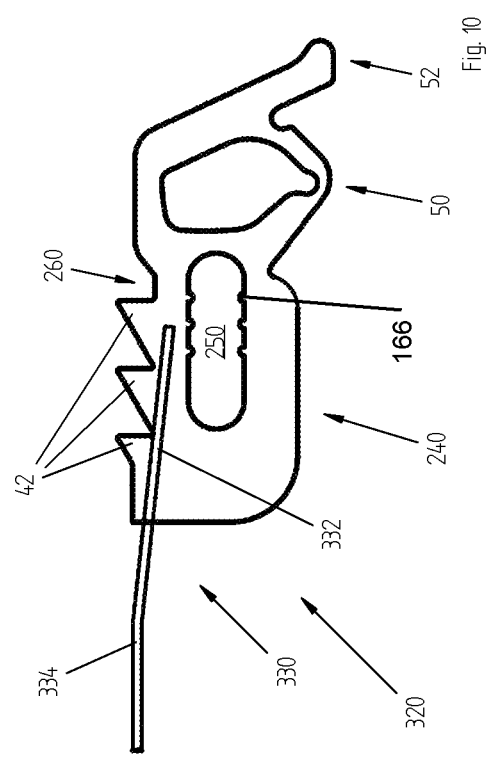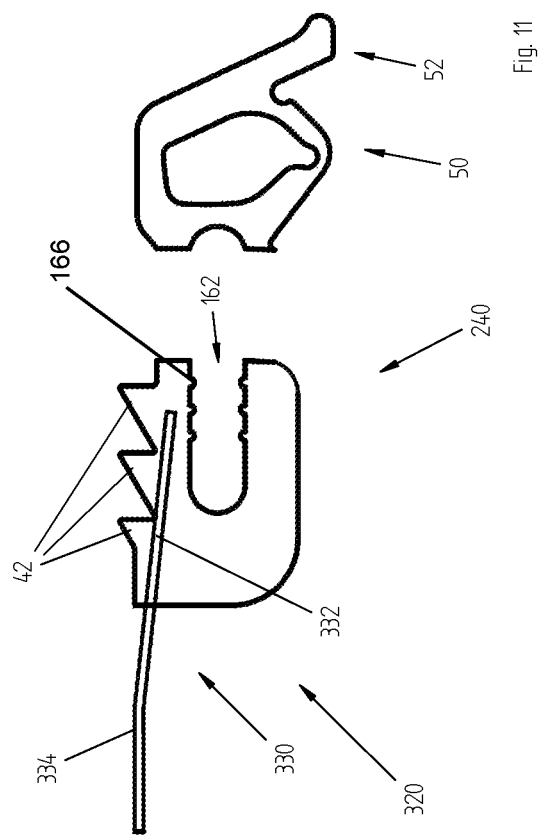

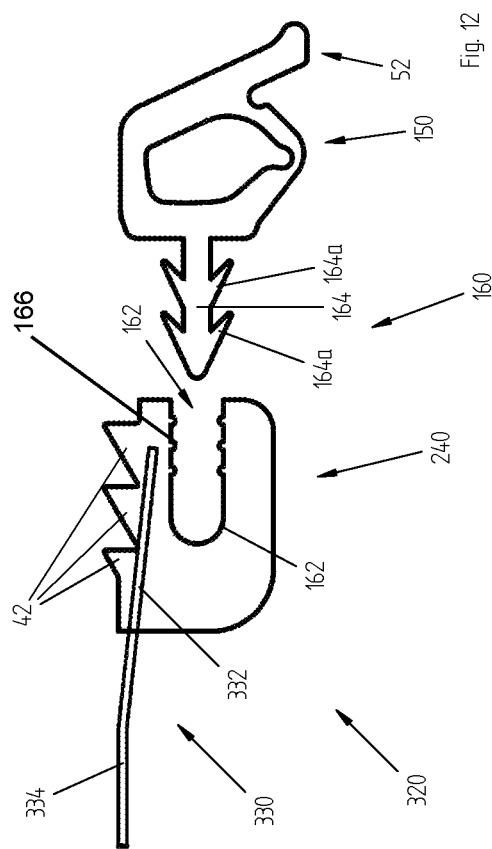
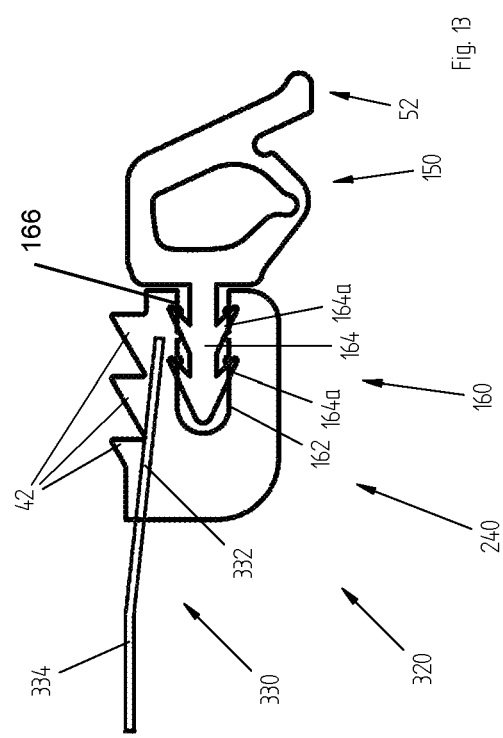

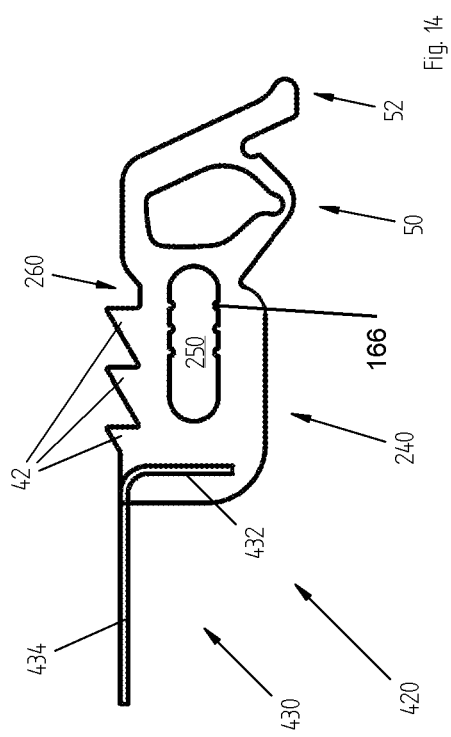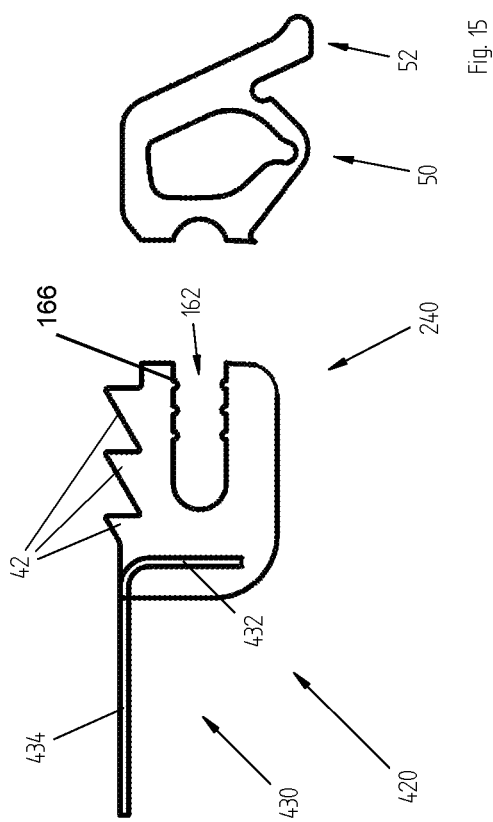

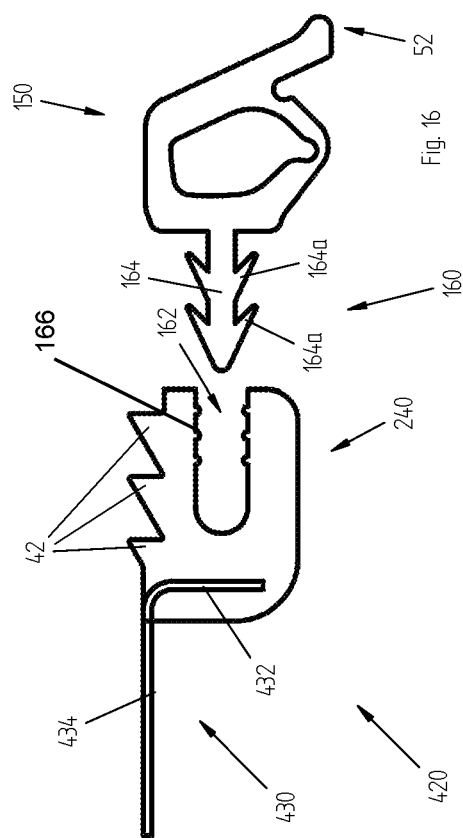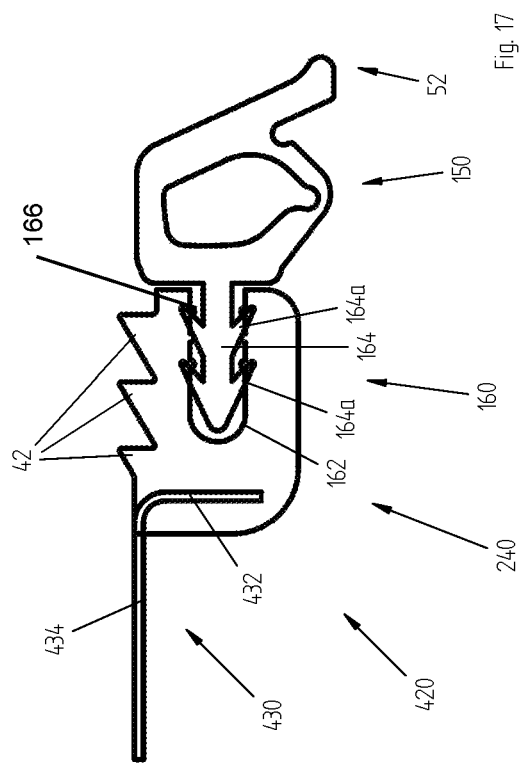

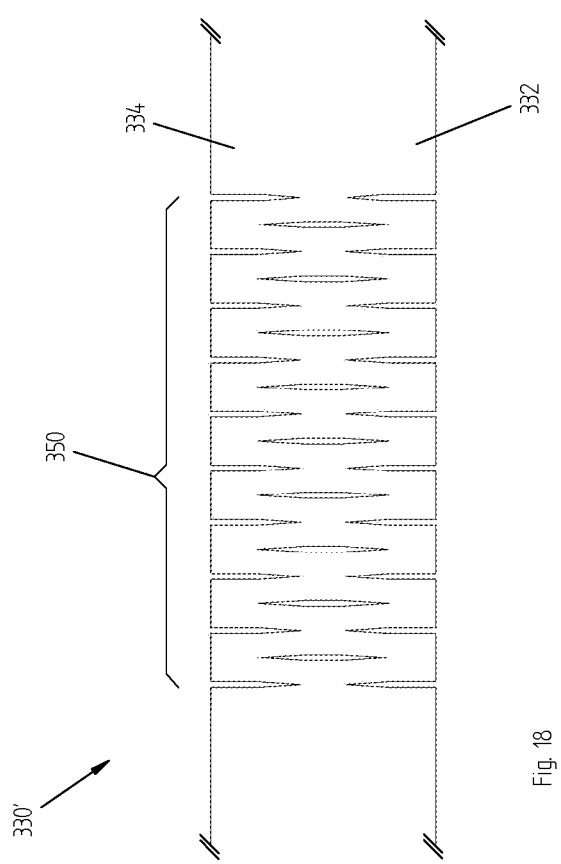

GASKET FOR DISHWASHER, DISHWASHER INCLUDING SUCH GASKET AND ASSOCIATED ASSEMBLY METHOD

FIELD OF THE INVENTION

The present invention relates to the manufacturing of seals used in dishwashers. In particular, the present invention relates to a seal which may be associated with the door of a dishwasher to prevent washing water and/or steam losses during normal washing operations.

The invention also relates to a dishwasher comprising such seal and to a method for assembling the seal on the dishwasher.

BACKGROUND ART

In the context of the manufacturing of dishwashers, the use of water and/or steam sealing seals ensuring a correct dishwasher operation is widely known. Dishwashers of the known type conventionally comprise a reception tub with a front opening inside which the cookware to be washed is positioned.

A door, conventionally hinged below and rotatable about a usually horizontal axis, opens/closes the front opening of the tub.

A perimeter seal is advantageously applied on the front edges of the opening, usually at the upper edge and at the two side edges, with the function of preventing washing water and/or steam from escaping from the dishwasher with the door closed during normal washing operations.

The solutions relating to seals of the known type comprise an extruded rubber profile, for example in EPDM, cut to size and inserted manually by pressure inside a seat made at the side edges of the front opening.

The insertion seat conventionally consists of a channel with a U-shaped open section which peripherally develops on the three sides of interest of the opening. The channel is conventionally obtained by welding a folded stainless steel profile on the outer sides of the dishwasher tub so that one side of the U-channel consists of the wall of the tub on which the folded profile is welded and the other two sides of the U-channel consist of the folded profile itself.

The seal assembly operations involve the preparation of the folded profile, the welding of the folded profile on the outer sides of the tub to create the U-shaped peripheral channel, preferably by means of a robot, and the manual insertion of the seal into the peripheral channel.

To facilitate the operations of inserting the seal into the channel by the operator, it is often necessary to employ various types of lubricants, for example, using talc or a solution of water and glycerin.

A first drawback in said assembly operations is due to the use of said lubricating products which introduce dirt on the assembly line.

During the life of the dishwasher, replacing the seal may also be required, in case of damage or loss of performance thereof.

The replacement of the seal involves a step of removing the old seal with the extraction thereof from the channel and the manual introduction of the new seal inside the channel. The insertion of the seal into the channel by the operator requires, again, the use of lubricants as mentioned above.

It is therefore the object of the present invention to overcome, at least partially, the drawbacks of the background art.

In particular, it is an object of the present invention to propose a seal for dishwashers which allows reducing assembly times and/or costs with respect to dishwashers of the known type.

It is another object of the present invention to propose a seal for dishwashers which allows simplifying assembly operations with respect to dishwashers of the known type.

It is another object of the present invention to allow the correct mounting of the seal by means of automatic assembly, preferably with robots, thus eliminating the human factor.

It is a further object of the present invention to propose a seal for dishwashers which allows avoiding the use of lubricants in assembly operations with respect to dishwashers of the known type.

Not least, it is an object to provide a seal which is reliable and easy to manufacture at competitive costs.

SUMMARY

The present invention is based on the general consideration of manufacturing a seal provided with a metal part.

In a first aspect thereof, the present invention therefore relates to a seal for dishwashers adapted to be interposed between a peripheral edge of an opening of a tub for cookware and a door for closing said opening, wherein the seal comprises:

a metal part adapted to be connected (fastened) to said peripheral edge of said opening;

a first part made of polymeric material integrally connected to said metal part and a second part made of polymeric material associated with said first part and adapted to be engaged resting and/or in thrust by said door when said door is arranged in the position for closing said opening.

In a preferred embodiment, the metal part comprises a first portion for the connection to the first part made of polymeric material and a second portion adapted for the connection (fastening) to the peripheral edge of the opening of the tub.

According to a preferred embodiment, the first portion of the metal part and the first part made of polymeric material are integrally connected by means of a co-extrusion process.

Preferably, the first portion of the metal part is embedded in the first part made of polymeric material.

In a preferred embodiment, the second portion of the metal part is connectable to the peripheral edge of the opening by means of a clinching process.

Preferably, the first part made of polymeric material and/or the second part made of polymeric material are made of EPDM and/or silicone material.

In a preferred embodiment, the polymeric material of the first part and the polymeric material of the second part are different polymeric materials. According to a preferred embodiment, the polymeric material of the first part has a greater hardness with respect to the polymeric material of the second part. Preferably, the first part made of polymeric material and the second part made of polymeric material form an integral single body.

In a preferred embodiment, the seal comprises a transition zone between the first part made of polymeric material and the second part made of polymeric material, said transition zone being adapted to be divided to remove the second part made of polymeric material from the first part made of polymeric material.

According to a preferred embodiment, the first part made of polymeric material comprises a hollow and closed inner zone.

Preferably, the hollow and closed inner zone is configured so that the dividing operation at the transition zone affects the hollow inner zone transforming said hollow inner zone into an open seat adapted to receive a projecting part of the second part made of polymeric material.

Preferably, the second part made of polymeric material is removably associated with the first part made of polymeric material.

In a preferred embodiment, the seal comprises connection means for the connection of the second part made of polymeric material to the first part made of polymeric material.

According to a preferred embodiment, the connection means comprise a seat of the first part made of polymeric material and a projecting part of the second part made of polymeric material adapted to be inserted, preferably by mechanical interference, in said seat.

In a preferred embodiment, the first portion of the metal part comprises a laminar portion and the second portion of the metal part comprises a laminar portion, said laminar portions being arranged in an L-shape.

According to another preferred embodiment, the first portion of the metal part comprises a laminar portion and the second portion of the metal part comprises a laminar portion, said laminar portions being aligned.

According to another preferred embodiment, the first portion of the metal part comprises two laminar portions arranged in an L-shape.

In a preferred embodiment, the metal part comprises a pre-cut zone adapted to make said metal part locally flexible.

In a second aspect thereof, the present invention relates to a dishwasher comprising a seal adapted to be interposed between a peripheral edge of an opening of a tub for cookware and a door for closing said opening, in which the seal is manufactured according to what has been described above.

In a third aspect thereof, the present invention relates to a method for manufacturing a seal according to what has been described above and the assembly thereof to a peripheral edge of an opening of a tub for cookware of a dishwasher, in which the method comprises the steps of:

integrally joining said first part made of polymeric material with said metal part to manufacture said seal comprising said metal part, said first part made of polymeric material and said second part made of polymeric material;

joining (fastening) said metal part of said seal to said peripheral edge.

In a preferred embodiment of the method, the step of integrally joining the first part made of polymeric material to the metal part is obtained by means of a co-extrusion process.

Preferably, the step of joining (fastening) the metal part of the seal to the peripheral edge is obtained by means of a clinching process.

BRIEF DESCRIPTION OF THE DRAWINGS

To better understand the features and advantages of the invention, non-limiting examples of practical embodiments thereof are described below with reference to the attached drawings in which corresponding or equivalent features and/or component parts of the present invention are identified by the same reference numerals. In particular, in the Figures:

FIG. 2 shows an axonometric view of a section of the seal of FIG. 1;

FIG. 3 shows an exploded view of the seal of FIG. 2;

FIG. 4 shows a sectional view of the seal in the assembled position in the dishwasher with the door closed of FIG. 1;

FIGS. 6 to 9 show a second embodiment variant of the seal of FIG. 4 and different configurations during the use thereof;

FIGS. 10 to 13 show a third embodiment variant of the seal of FIG. 4 and different configurations during the use thereof;

FIGS. 14 to 17 show a fourth embodiment variant of the seal of FIG. 4 and different configurations during the use thereof;

FIG. 18 shows a plan view of an embodiment variant of an element of the seal of FIG. 10.

DETAILED DESCRIPTION OF THE INVENTION

Figure 1:
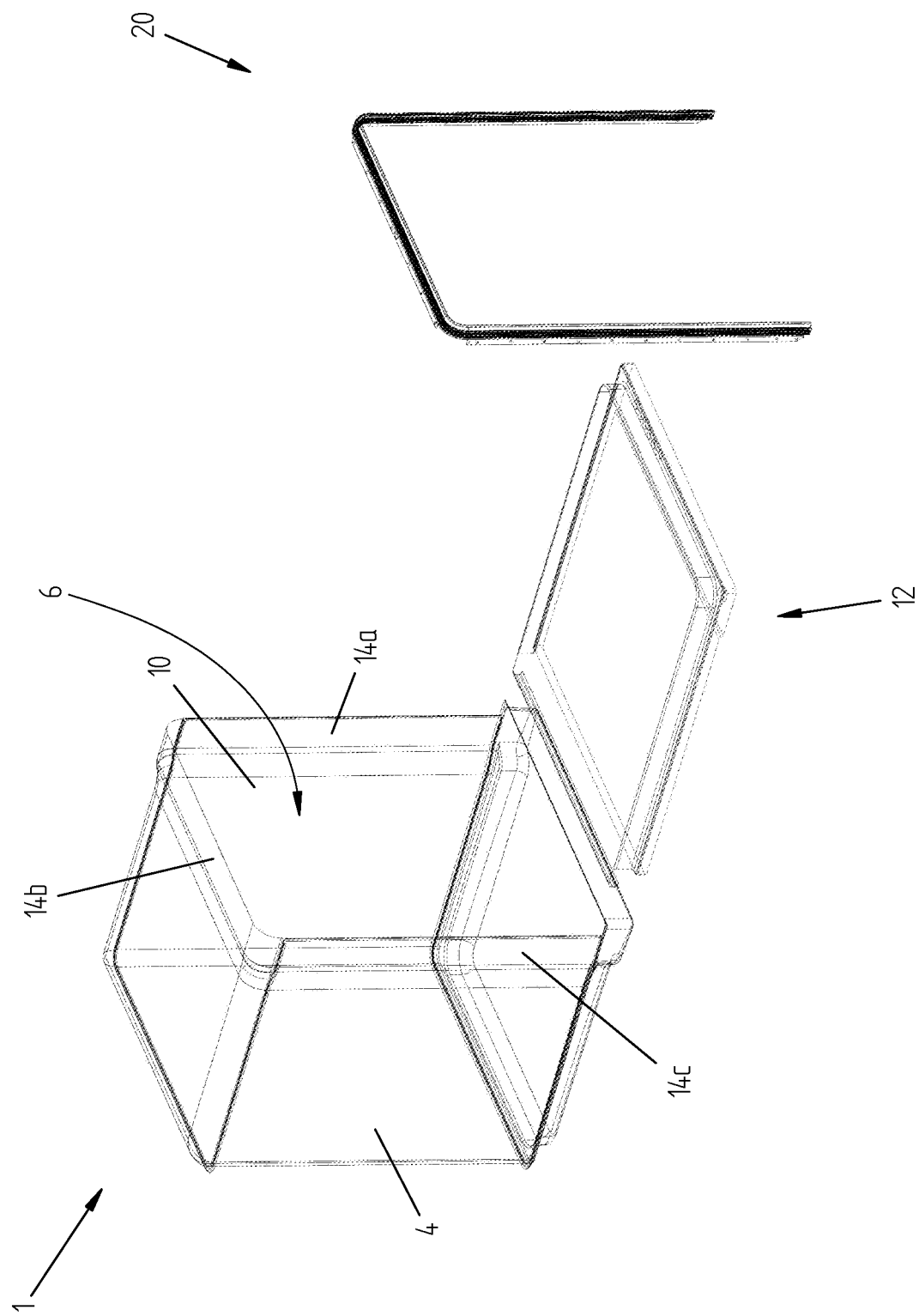
FIG. 1 shows an axonometric view of a dishwasher and a seal according to a preferred embodiment of the present invention.

Although the present invention is described below with reference to the preferred embodiments thereof depicted in the drawings, the present invention is not limited to the embodiments described below and depicted in the drawings. On the contrary, the embodiments described and depicted clarify some aspects of the present invention, the general scope of which is defined by the claims.

The present invention has proved to be particularly advantageous with reference to the manufacturing of a seal for a dishwasher of the standard type, i.e. a dishwasher with front opening and door hinged at the bottom, built-in or stand alone, as better shown below.

It should however be noted that the present invention is not limited to the manufacturing of a seal for a dishwasher of this type. On the contrary, the present invention finds convenient application in dishwashers with any type of opening configuration and corresponding door.

FIG. 1 shows a dishwasher 1 comprising a seal 20 according to a preferred embodiment of the present invention and, with reference to FIGS. 1 to 4, the seal 20 according to the preferred embodiment of the present invention is shown and described.

The dishwasher 1 preferably comprises an outer support structure 4, preferably of a parallelepiped shape, and a tub 6 with a front opening 10 for receiving the cookware to be washed.

A door 12 is hinged to the support structure 4 for closing the front opening 10. The door 12 is preferably hinged below, the door 12 being, in particular, rotatable about a substantially horizontal axis.

According to an aspect of the present invention, a perimeter seal 20 is applied to corresponding portions 14a, 14b, 14c of the inner surfaces of the tub 6, in particular, of the inner surfaces of the side and opposite walls and of the upper wall of the tub 6. Each of the portions 14a, 14b and 14c therefore face towards the inside of the tub 6, wherein the portions 14a and 14c mutually face each other (one opposite the other), and wherein the portions 14a and 14c are mutually connected by the portion 14b, the portions 14a, 14b and 14c being further positioned near the outer edge of the tub 6, and therefore of the front opening 10. In the preferred embodiment shown and described herein, the perimeter seal 20 shows, in general, a three-sided shape, substantially an inverted U shape, to be applied to the corresponding three peripheral portions 14a, 14b, 14c. It is evident that in embodiment variants, the shape and the number of peripheral edges or portions and the corresponding shape of the seal may be different from what is shown herein.

According to an aspect of the present invention, the seal 20 comprises a metal part 30 adapted to be connected (fastened) to the corresponding peripheral portion 14a, 14b, 14c of the tub 6 near the opening 10, a first part 40 made of polymeric material and a second part 50 made of polymeric material. The second part 50 made of polymeric material is adapted to be engaged in thrust or at least resting on the door 12 when the door is arranged in the position for closing the opening 10, as it may be observed in FIG. 4.

The first part 40 made of polymeric material is integrally connected to the metal part 30.

Furthermore, preferably, the first part 40 made of polymeric material and the second part 50 made of polymeric material form an integral single body. The metal part 30 comprises a first portion 32 for the connection to the first part 40 made of polymeric material and a second portion 34 adapted for the connection (fastening) to the corresponding portion 14a, 14b, 14c.

In a preferred embodiment, the first portion 32 of the metal part 30 and the first part 40 made of polymeric material are integrally connected by means of a co-extrusion process.

The first portion 32 of the metal part 30 is preferably embedded in the first part 40 made of polymeric material.

More preferably, the entire seal 20, i.e., the metal part 30, the first part 40 and the second part 50 made of polymeric material are manufactured by means of a co-extrusion process.

The first part 40 is advantageously provided with sealing flaps 42 adapted to be arranged in abutment against the peripheral edge or surface portion 14a, 14b, 14c to improve the adhesion of the seal 20 to the peripheral edge or portion 14a, 14b, 14c.

The second part 50 is advantageously provided with a sealing portion 52 designed to ensure the hydraulic seal against the escape of liquid/steam from the tub 6 during operation.

The polymeric material of the first part 40 and/or the polymeric material of the second part 50 is preferably EPDM. Alternatively, TPE thermoplastic rubbers, of the TPE-S, TPE-V, TPE-U type, or silicon may also be used.

In an embodiment variant, the second part 50 preferably comprises closed cell foam rubber.

In a preferred embodiment, the polymeric material of the first part 40 is selected so as to have a greater hardness with respect to the polymeric material of the second part 50.

In preferred embodiment variants, however, the first part 40 and the second part 50 may have the same hardness.

A greater hardness for the first part 40 ensures a greater structural seal of the first part 40 itself while a lower hardness for the second part 50 ensures a better hydraulic seal of the second part 50 itself. A better hydraulic seal is also ensured in the case of using a closed cell foam rubber for the second part 50.

To improve the sealing, elasticity and weight features of the second part 50, the same is made in a tubular shape. Alternatively, the second part 50 may have an open configuration, substantially defining a lip shape.

Preferably, the polymeric material of the first part 40 has a hardness from 70 to 95 Shore A, more preferably a hardness from 80 to 90 Shore A.

Preferably, the polymeric material of the second part 50 has a hardness from 30 to 70 Shore A, more preferably a hardness from 40 to 60 Shore A.

Preferably, in the case of using closed cell foam rubber for the second part 50, the density of the second part 50 is preferably from 0.35 gr/cm$^3$ to 0.95 gr/cm$^3$.

The metal part 30 is preferably made of steel, preferably of a material adapted to be used in a clinching process. The metal part 30 is generally and preferably made of the same metal material used for the manufacturing of the tub 6. In the preferred embodiment shown, the first portion 32 of the metal part 30 comprises two laminar portions arranged in an L-shape and the second portion 34 of the metal part 30 comprises a laminar portion.

As a whole, the metal part 30 shows a substantially S-shape, as better visible in FIG. 3 and FIG. 4, wherein, with particular reference to FIG. 4, it is possible to appreciate that, by virtue of the substantially S-shape, the laminar portion 34 is adapted to be fastened to the peripheral edge 14a, 14b, 14c, the first laminar portion of the portion 32 extends from the laminar portion 34 along a direction substantially perpendicular to the extension direction of the portion 34, the second laminar portion of the portion 32 extends along a direction substantially perpendicular to the first laminar portion of the portion 32 and substantially parallel to the extension direction of the portion 34.

In embodiment variants, however, the metal part may have different shapes, as shown and described below with reference to FIGS. 10 to 18, wherein, according to the present invention, in the case of an S-shaped metal part, the angle between the first laminar portion of the portion 32 and the portion 34, and the angle between the second laminar portion and the first laminar portion of the portion 32 may vary.

The seal according to the invention allows simplifying the dishwasher manufacturing operations.

First of all, the seal 20 is made by integrally joining the first part made of polymeric material 40 and the second part 50, associated therewith, to the metal part 30 to manufacture the seal 20.

Such joining is preferably but not exclusively obtained by means of a co-extrusion process.

The seal 20 thus manufactured is then connected to the peripheral edges or portions 14a, 14b, 14c of the opening 10 of the tub 6.

The connection is made by fastening the metal part 30 to the peripheral edges 14a, 14b, 14c of the opening 10 of the tub 6, in particular by fastening or, in general, by connecting the second portion 34 of the metal part 30 to the peripheral edges 14a, 14b, 14c of the opening 10 of the tub 6.

Such fastening or joining is preferably obtained by means of a clinching process. In embodiment variants different joining processes may be used, for example a spot welding process.

Advantageously, the operations for manufacturing and assembling the seal to the dishwasher are simplified with respect to the systems of the known type. The result is a reduction in the corresponding assembly times and/or costs with respect to the dishwashers of the known type.

Furthermore, advantageously, said steps may be carried out allowing the repeatability of the positioning during the assembly. Furthermore, advantageously, said steps do not involve the use of any lubricating substance in use in the background art to facilitate the insertion of the seal in the prepared seat.

Figure 5:
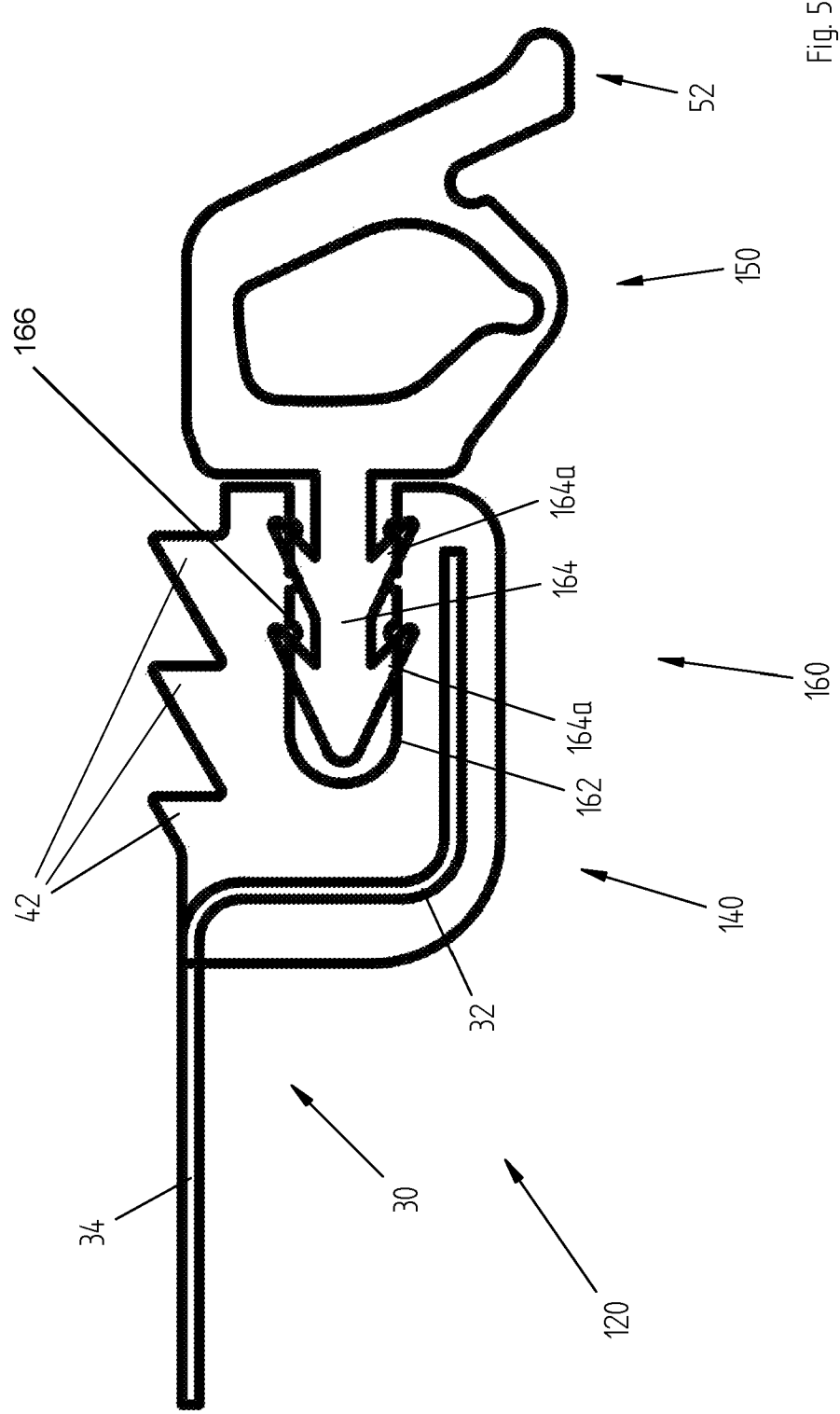
FIG. 5 shows a first embodiment variant of the seal of FIG. 4.

With reference to FIG. 5, a first embodiment variant of a seal 120 according to the invention is described.

Features and/or component parts corresponding or equivalent to those of the previous embodiment are identified by the same reference numerals.

The seal 120 differs from the seal 20, described with reference to FIGS. 1 to 4, in that the second part 150 made of polymeric material is removably associated with the first part 140 made of polymeric material.

Connection means 160 allow the connection of the second part 150 made of polymeric material to the first part 140 made of polymeric material.

The connection means 160 preferably comprise a seat 162 made in the first part 140 made of polymeric material and a projecting part 164 of the second part 150 made of polymeric material adapted to be inserted by mechanical interference in such seat 162.

The projecting part 164 is preferably provided with elastic flaps 164a adapted to facilitate the insertion and seal of the second part 150 made of polymeric material and the first part 140 made of polymeric material.

With regard to the features of the first and second parts 140, 150, such as, for example, the type of material and/or the hardness thereof, what has been described above with reference to the first embodiment is valid.

Also the seal 120 according to such embodiment allows simplifying the dishwasher manufacturing operations.

In a first embodiment method, the assembly consisting of the first part made of polymeric material 140 and the metal part 30 is made, preferably by means of a co-extrusion process.

The assembly thus made is then connected (fastened or applied) to the peripheral edges 14a, 14b, 14c of the opening 10 of the tub 6.

The connection is made by joining the metal part 30 to the peripheral edges 14a, 14b, 14c of the opening 10 of the tub 6, preferably by clinching as described above.

The second part 150 made of polymeric material is therefore connected by mechanical interference to the first part 140 made of polymeric material. In an embodiment variant, the second part 150 made of polymeric material is first connected by mechanical interference to the first part 140 made of polymeric material of the assembly and therefore the complete seal 120 is connected to the peripheral edges 14a, 14b, 14c of the opening 10 of the tub 6.

A further advantageous aspect of such embodiment, in addition to those already mentioned with reference to the first embodiment, derive from the detachability features of the second part 150 made of polymeric material which allows the removal thereof with respect to the first part 140 made of polymeric material, to be, for example, easily replaced with a new spare second part.

This allows reducing the times and/or the maintenance costs due to damage or loss of performance of the seal 120 over time.

With reference to FIGS. 6 to 9, a second embodiment variant of a seal 220 according to the invention is described.

Features and/or component parts corresponding or equivalent to those of the previous embodiments are identified by the same reference numerals. The seal 220 differs from the seal 20, described with reference to FIGS. 1 to 4, in that the first part 240 made of polymeric material comprises a hollow inner zone 250.

Furthermore, a transition zone 260 is identified between the first part 240 made of polymeric material and the second part 50 made of polymeric material.

The transition zone 260, preferably made by reducing the thickness of the material, defines a zone adapted to be divided to remove the second part 50 made of polymeric material from the first part 240 made of polymeric material, as shown in FIG. 7.

The division is preferably carried out by cutting, for example, with a cutter. Advantageously, following the dividing operation, the hollow inner zone 250 of the first part 240 made of polymeric material, originally closed or blind, becomes an open seat 162, of the type previously shown in FIG. 5.

Such open seat 162 is advantageously shaped to receive a projecting part 164 of a second part 150 made of polymeric material adapted to be inserted by mechanical interference, for example against opposing protrusions or ridges 166 formed in such seat 162, as shown in FIGS. 8 and 9. In a first advantageous aspect, such embodiment involves the manufacturing and the assembly of the seal 220 in substantially the same manner described above with reference to the first embodiment, allowing obtaining all the mentioned advantages.

Furthermore, in a further advantageous aspect thereof, the seal 220 allows reducing the times and/or the maintenance costs due to damage or loss of performance over time of the seal 220, in particular of the second part 50 made of polymeric material.

In fact, in the case of a maintenance intervention on the seal 220, it will be sufficient to remove the second part 50 made of polymeric material from the first part 240 (FIG. 7), preferably by cutting it at the transition zone 260, to be easily replaced with a new second part 150 (FIGS. 8 and 9).

With reference to FIGS. 10 to 13, a third embodiment variant of a seal 320 according to the invention is described.

Features and/or component parts corresponding or equivalent to those of the previous embodiments are identified by the same reference numerals. The seal 320 differs from the seal 220 described with reference to FIGS. 6 to 9 in the different shape of the metal part 330.

The metal part 330 comprises a first portion 332 consisting of a laminar portion and a second portion 334 consisting of a laminar portion, said laminar portions 332, 334 being contiguously aligned, or substantially aligned, wherein, as shown, the first portion 332 may extend from the second portion 334 along an extension direction different from the extension direction of the second portion 334, and therefore so as to define two angles, an outer one (at the top in FIGS. 12 and 13) greater than 180°, and an inner one (at the bottom in FIGS. 12 and 13) lesser than 180°.

Thereby, the fastening of the portion 334 to the portion or edge 14a, 14b, 14c, results in the positioning of the portion 332 at a set distance (variable according to the aforesaid angles) from the portion or edge 14a, 14b, 14c, the fastening, therefore, being not hindered by the sealing flaps 42 which may therefore be positioned resting against the portion or edge 14a, 14b, 14c.

The metal part 330 has a substantially flat bar shape.

The remaining features, as well as the maintenance steps, are shown in FIGS. 11 to 13, which substantially correspond to what has been described above with reference to the second embodiment shown in FIGS. 7 to 9.

With reference to FIGS. 14 to 17, a fourth embodiment variant of a seal 420 according to the invention is described.

Features and/or component parts corresponding or equivalent to those of the previous embodiments are identified by the same reference numerals. The seal 420 differs from the seal 220 described with reference to FIGS. 6 to 9 in the different shape of the metal part 430.

The metal part 430 comprises a first portion 432 consisting of a laminar portion and a second portion 434 consisting of a laminar portion, said laminar portions 432, 434 being arranged in an L-shape, or substantially perpendicular to each other, the angle defined by the portions 432 and 434 being capable of varying according to needs and/or circumstances, the inner angle, in particular, being capable of varying from 90° to 150°.

It is noted that the seal according to the invention, in the various embodiments, may be made in a single piece ready for assembly, such as, for example, shown in FIG. 1 in which the seal is formed by an inverted U-shaped single piece. In embodiment variants, sections of different shapes and/or different lengths may be provided, for example, three sections which are assembled at the respective peripheral edges 14a, 14b, 14c of the opening 10 of the tub 6.

In the manufacturing of the seal in which a curvature thereof is provided, for example, two 90° bends for the abovementioned inverted U-shape, the metal part may be suitably configured to favor the curvature/deformation thereof.

In a preferred embodiment, for example, the metal part may be pre-cut completely or only locally at the curvature zone, so as to make the metal part more flexible and allow the curvature of the seal.

A possible embodiment which uses such technique is shown in FIG. 18. The metal part 330' shown in FIG. 18 constitutes an embodiment variant of the metal part 330, or flat bar, shown in the seal 320 of FIGS. 10 to 13.

The metal part 330' differs from the metal part 330 described above in that it comprises a localized pre-cut zone 350.

The pre-cut zone 350 makes the metal part 330' locally flexible and allows the curvature thereof and the curvature of the seal in which it is used.

It has therefore been demonstrated by means of the present description that the seal according to the present invention allows achieving the set objects. In particular, the seal according to the present invention is preferably assembled by an automated system to allow the correct position in assembly, preferably by means of a robot, this further allowing reducing assembly times and/or costs with respect to dishwashers of the known type.

Although the present invention has been previously clarified by means of the detailed description of some embodiments depicted in the drawings, the present invention is not limited to the embodiments described above and depicted in the drawings; on the contrary, further variants of the embodiments described are within the scope of the present invention, scope defined by the claims.

The invention claimed is:

1. A seal for a dishwasher including a tub having an opening for receiving cookware and a door for closing the opening, the seal being configured to be interposed between a peripheral edge of the tub opening and the door for closing said opening, the seal comprising:
    a metal part adapted to be connected to said peripheral edge of said opening;
    a unibody gasket member having a first part, made of polymeric material, integrally connected to said metal part and a second part, made of polymeric material, associated with said first part and adapted to be contacted by said door when said door is arranged in a position for closing said opening,
    wherein said metal part comprises a first portion for the connection to said first part of the unibody gasket member and a second portion configured for the connection to said peripheral edge of said opening of said tub,
    wherein said gasket member comprises a transition zone between said first and second parts, said first and second parts being connected to each other at the transition zone to define the unibody gasket member, said transition zone being configured in a manner to enable permanent detachment of said second part from said first part of the unibody gasket member,
    wherein said first part comprises a hollow inner zone configured so that following said permanent detachment of the second part from the first part at said transition zone, said hollow inner zone defines a seat that is configured to receive and retain a projecting member extending from a replacement second part which replaces the detached second part; and
    wherein said seat includes protrusions configured for mechanical interface with the projecting member extending from the replacement second part upon insertion into the seat.

2. The seal according to claim 1, wherein said first portion of said metal part and said first part made of polymeric material are integrally connected by means of a co-extrusion process.

3. The seal according to claim 2, wherein said first portion of said metal part is buried in said first part made of polymeric material.

4. The seal according to claim 3, wherein said second portion of said metal part is connectable to said peripheral edge of said opening by means of a clinching process.

5. The seal according to claim 1, wherein said first part made of polymeric material and/or said second part made of polymeric material are made in a material chosen in a group consisting of EPDM, TPE thermoplastic rubber, of the TPE-S, TPE-V, TPE-U type, and silicon.

6. The seal according to claim 1, wherein said polymeric material of said first part and the polymeric material of said second part are different materials.

7. The seal according to claim 1, wherein said polymeric material of said first part has a greater hardness with respect to the polymeric material of said second part.

8. The seal according to claim 1, wherein said projecting member is configured for insertion into said seat by mechanical interference.

9. The seal according to claim 1, wherein the hollow inner zone is formed as a closed cavity.

10. The seal according to claim 9, wherein the closed cavity has a circumferentially closed cross section.

11. The seal according to claim 1, wherein said second part comprises a hollow inner zone.

12. The seal according to claim 1, wherein said second part is devoid of a projecting member suitable to be received in said seat.

13. The seal according to claim 1, wherein said second part is configured for detachment from said first part by a cutting device.

14. A kit comprising the seal according to claim 1 including the first and second parts connected to each other, and the replacement second part having the projecting member adapted to be received in said seat of the seal.

15. The kit according to claim 14, wherein said projecting member extending from the replacement second part is provided with elastic flaps.

* * * * *